United States Patent [19]

Kunz

[11] 4,109,738

[45] Aug. 29, 1978

[54] WEIGHING APPARATUS INCLUDING LEVER-CONNECTED COMPENSATION COIL MEANS

[75] Inventor: Peter Kunz, Tann-Ruti, Switzerland

[73] Assignee: Mettler Instrument AG, Greifensee, Switzerland

[21] Appl. No.: 766,760

[22] Filed: Feb. 8, 1977

[30] Foreign Application Priority Data

Apr. 1, 1976 [CH] Switzerland .................. 4054/76
Apr. 1, 1976 [CH] Switzerland .................. 4055/76

[51] Int. Cl.$^2$ .................... G01G 7/00; G01G 1/18
[52] U.S. Cl. ............................... 177/212; 177/251
[58] Field of Search ......... 177/210 EM, 212, DIG. 9, 177/251

[56] References Cited

U.S. PATENT DOCUMENTS

| | | | |
|---|---|---|---|
| 3,734,218 | 5/1973 | Kupper | 177/212 X |
| 3,915,247 | 10/1975 | McFayden et al. | 177/DIG. 9 |
| 3,955,638 | 5/1976 | Wasko | 177/212 |
| 4,039,036 | 8/1977 | Baumgartner et al. | 177/212 |

*Primary Examiner*—George H. Miller, Jr.
*Attorney, Agent, or Firm*—Lawrence E. Laubscher

[57] ABSTRACT

An improved weighing apparatus of the electromagnetic load compensation type is disclosed, characterized by the provision of a horizontal one- or two-arm lever connected at one end with a compensation coil carrier device, a first bearing device connecting said lever for pivotal movement in a vertical plane relative to a pot-type permanent magnet, and a second bearing device connecting the pan carrier member with the lever. Preferably the first and second bearing devices comprise vertical flexible hanger straps that are bendable about parallel horizontal axes. In the one-arm embodiment, the lever is connected at its other end with the permanent magnet by the first bearing device, the pan carrier member being connected by the second bearing device to an intermediate portion of the lever. In the two-arm embodiment, an intermediate portion of the lever is connected with the permanent magnet by the first bearing device, and the other end of the lever is connected with the pan carrier by the second bearing device.

17 Claims, 5 Drawing Figures

WEIGHING APPARATUS INCLUDING LEVER-CONNECTED COMPENSATION COIL MEANS

BRIEF DESCRIPTION OF THE PRIOR ART

Weighing systems of the electromagnetic load compensation type are well known in the patented prior art, as evidenced by the U.S. Pat Nos. to Baumgartner 3,677,357, Strobel 3,688,854, Kunz 3,786,678 and 3,786,883, Strobel et al 3,789,937 and Baumann et al 3,816,156, among others. In these known weighing systems, a compensation coil is connected with the movable pan carrier for displacement relative to stationary permanent magnet means. When the pan carrier is displaced by the application of load thereto from an initial no-load position, compensation current is supplied to the compensation coil to generate an electromagnetic force in the air gap of the permanent magnet means to return the pan carrier to its initial no-load position, the magnitude of the compensation current being measured to afford an indication of the magnitude of the load being weighed.

One problem inherent in the known systems is that of increasing the weighing range of the apparatus without unnecessarily increasing the size or cost of the means for generating the electromagnetic force effect (i.e., without increasing the compensating current flowing through the compensation coil, the number of coil windings, or the strength of the magnetic field). Furthermore, it is desirable to provide an improved weighing scale construction that is of amore durable, compact design without any reduction in the accuracy of the weighing measurement.

The present invention was developed to avoid the above and other drawbacks of the prior electromagnetic load compensation weighing systems.

SUMMARY OF THE INVENTION

Accordingly, a primary object of the present invention is to provide weighing apparatus of the electromagnetic load compensation type including one- or two-arm lever means for connecting the compensation coil carrier means and the pan carrier means for simultaneous vertical movement relative to pot-type permanent magnet means. First bearing means connect the lever for pivotal movement in the vertical plane relative to the permanent magnet means, and second bearing means connect the pan carrier means with the lever. Preferably the first and second bearing means comprise vertical flexible hanger straps that are bendable about parallel horizontal bending axes. In the one-arm lever embodiment, the other end of the lever is suspended from a fixed point relative to the permanent magnet means by the first bearing means, and the pan carrier is suspended from an intermediate portion of the lever by the second bearing means. In the two-arm embodiment, and intermediate portion of the lever is suspended from a fixed point relative to the permanent magnet means by the first bearing means, and the pan carrier is suspended from the other end of the lever by the second bearing means.

In accordance with another object of the invention, the pan carrier is connected for vertical movement relative to the permanent magnet means by horizontal resilient first guide means having in horizontal cross-section the configuration of an isosceles triangle the apex of which is connected with the pan carrier means, and the base portion of which is connected with an extension of the permanent magnet means on the opposite side thereof from the pan carrier member. In order to effect compactness of the apparatus, the lever is arranged on the same side of the permanent magnet means as the pan carrier member, said lever having in horizontal cross-section the configuration of an isosceles triangle the apex of which is connected with the coil carrier means and the base portion of which is connected with the permanent magnet means on the side thereof adjacent the pan carrier member, whereby the isosceles triangles defined by the lever and the first guide means face in opposite directions. The first guide means preferably include horizontal vertically spaced upper and lower guide means arranged above and below the permanent magnet means, respectively. According to another feature of the invention, horizontal second guide means may be provided for guiding the coil carrier means for vertical movement relative to the permanent magnet means, said second guide means being arranged on the opposite side of the permanent magnet means from the lever. Preferably the second guide means also has in horizontal cross-section the configuration of an isosceles triangle the apex of which is connected with the coil carrier means and the base portion of which is connected with the permanent magnet means adjacent the base portion of the triangle defined by the lever.

In the two-arm embodiment, the advantage is presented that the compensation coil serves as a counterweight for the pan carrier means. In accordance with another important feature of the invention, spacer means may be provided for adjusting the position of at least one of the bearing means longitudinally of the lever, thereby to adjust the effective operating length of the lever for various weighing ranges and/or for varying degrees of resolution.

In accordance with the present invention, the permanent magnet system and both parallel guide means are preferably attached to a common base plate. This design is very rigid and exhibits little sensitivity to corner load errors. In another practical version, the permanent magnet system is clamped between a base plate and a cover plate, whereby the lower guide means are attached to the base plate while the upper guide means and the main bearing of the translation lever are attached to the cover plate. While on the one hand this embodiment requires a somewhat longer cover plate, on the other hand it is even more rigid and even less sensitive to corner load errors.

A particularly compact design of the scale can be obtained if the pan carrier and coil carrier guide means face each other, the scale dish carrier being arranged in the area of the guides of the coil carrier.

In the one-arm lever embodiment, the coil carrier means includes a dish-shaped coil carrier member arranged beneath the permanent magnet means and a coil carrier rod that extends vertically upwardly from the dish-shaped member through a central bore contained in the permanent magnet means. In the two-arm embodiment, the vertical rod portion of the coil carrier means is eliminated, and further the resulting apparatus eliminates dead-load and has a corresponding insensitivity to disturbing vibrations.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
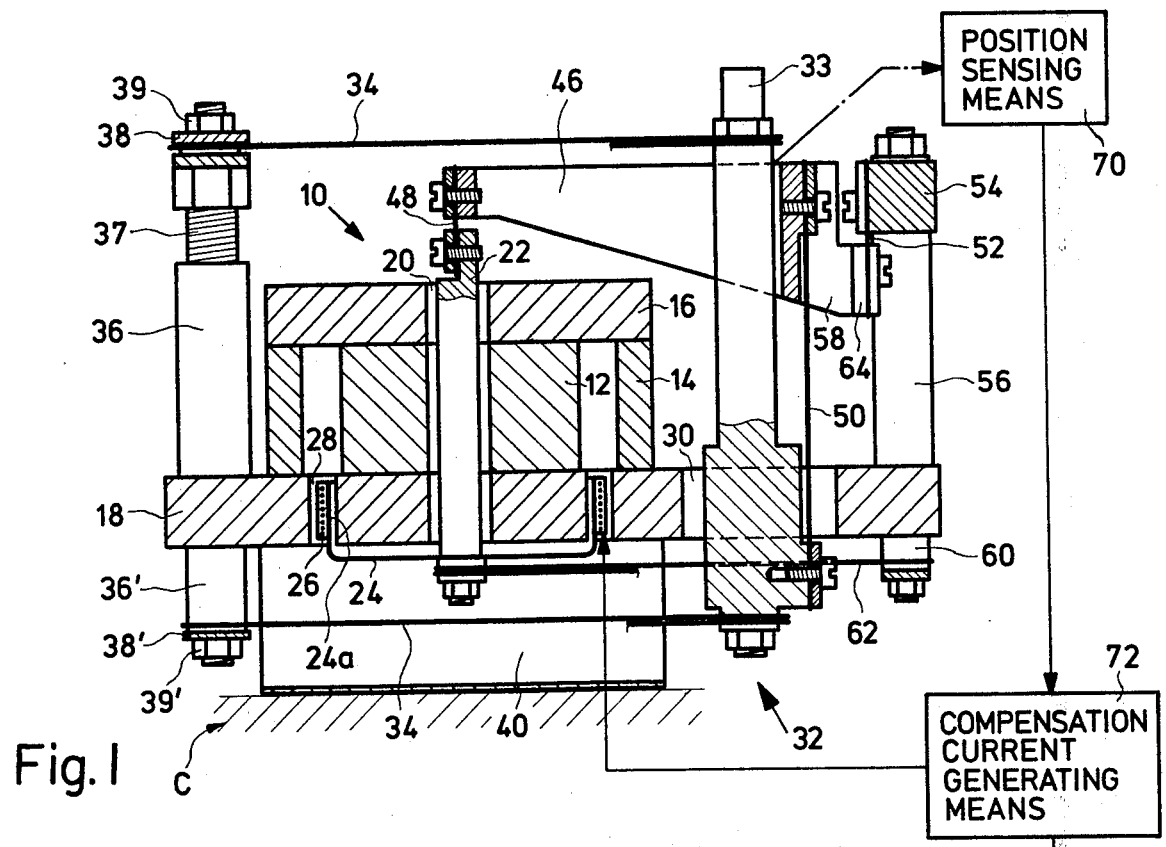
FIGS. 1 and 2 are longitudinally sectioned side elevation and top plan views, respectively, of a one-arm lever embodiment of the weighing apparatus of the present invention.
Figure 2:
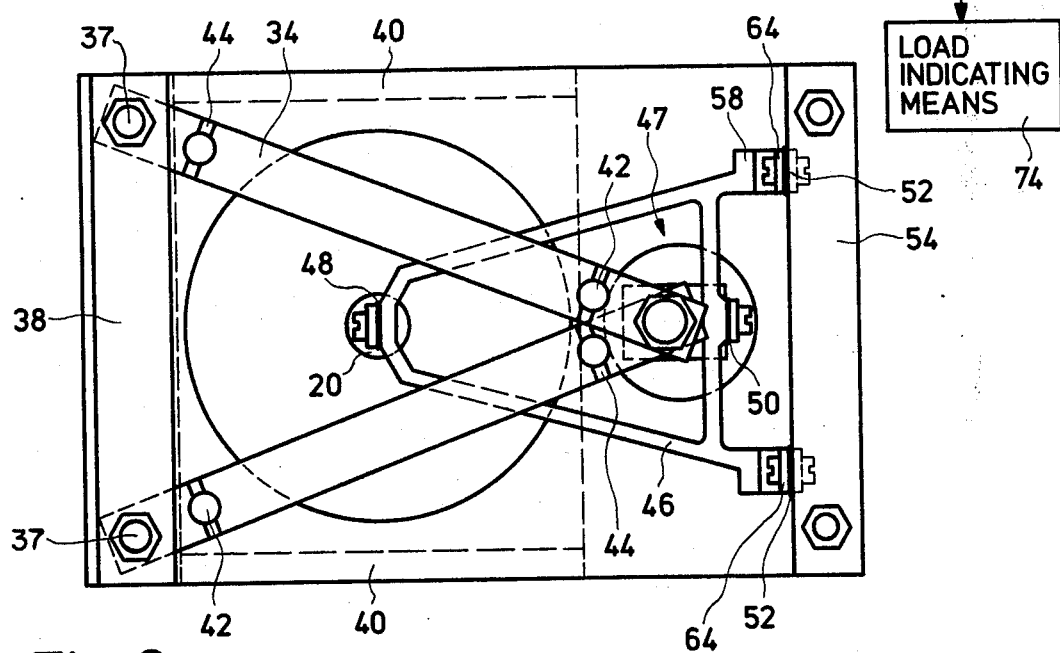

Referring first more particularly to FIGS. 1 and 2, the weighing apparatus of the present invention is of the electromagnetic load compensation type including pot-shaped permanent magnet means 10 including a cylindrical core portion 12, and annular ferromagnetic portion 14 arranged in concentrically spaced relation about the core portion 12, a horizontal cover plate portion 16 and a horizontal base plate portion 18. As shown in FIG. 1, the base plate portion 18 extends at opposite ends beyond the ferromagnetic cylindrical portion 14. The base plate 18 contains an annular opening 28 arranged concentrically relative to the core portion 12, which opening defines an annular air gap in which is concentrically mounted the compensation coil 26. The compensation coil 26 is mounted upon the upwardly extending cylindrical flange portion 24a of a dish-shaped member 24 arranged beneath the base plate 18. Preferably the dish-shaped member 24 is formed of a synthetic plastic material, the central portion of the dish-shaped member being connected with the lower end of a coil carrier rod 22 that extends upwardly through a central bore 20 contained within the permanent magnet means 10.

The base plate 18 also contains an opening 30 in which is mounted for vertical displacement the scale and carrier member 32 having at its upper end a pin-shaped extension for connection with the weighing pan (not shown). The pan carrier member 32 is guided for vertical movement relative to the permanent magnet means 10 by first horizontal resilient guide means 34. More particularly, upper and lower resilient guide means 34 are arranged above and below the permanent magnet means 10, each of said first guide means having in horizontal cross-section the configuration of an isosceles triangle as shown in FIG. 2. Thus, the apex portions of the upper and lower first guide means 34 are connected with the upper and lower ends of the pan carrier member 32. The base portions of the triangles defined by the upper and lower guide means 34 are connected in spaced relation to the horizontal base plate 18 by pairs of spaced vertical posts 36 and 36'. As shown in FIGS. 1 and 2, horizontal sheet metal strips 38 and 38' are connected between the upper and lower ends of the vertical posts 36 and 36' respectively, the assembly of the post components being effected by means of nuts 39 and 39' and the through bolts 37.

In accordance with the present invention, a one-arm lever 46 is provided that is connected at one end with the upper end of the coil carrier rod 22. At its other end, the lever has a pair of laterally spaced extension portions 58 that are connected with a fixed point relative to the permanent magnet means 10 by a pair of first bearing means 52. The pan carrier member 32 is connected with an intermediate portion of the lever 46 by second bearing means 50, and, as illustrated in FIGS. 1 and 2, the first end of the lever is connected with the coil carrier rod 22 by third bearing means 48. In accordance with the present invention, each of the bearing means 52, 50, and 48 comprises a flexible element (such as a sheet metal strip) that is bendable about parallel horizontal axes. As shown in FIG. 2, the lever 46 has in horizontal cross-section the configuration of an isosceles triangle the apex portion of which is connected with the upper end of the coil carrier rod 22 by the third bearing means 48, and the base portion of which is connected to a stationary lateral support member 54 by means of a pair of transversely spaced first bearing means 52. The lateral support member 54 is supported by vertical posts 56 in horizontal spaced relation above the base plate 18. The bendable support straps 52 thereby permit pivotal movement of the lever 46 in the vertical plane about the horizontal bending axis of the aligned first hanger straps 52. As shown in FIG. 2, the lever 46 is formed of a frame having a central opening 47 through which the vertical pan carrier member 32 extends, said pan carrier member being connected with an intermediate portion of the lever 46 by means of the suspension strap 50. Thus, it will be apparent that the isosceles triangles defined by the upper and lower guide means 34 extend in opposite directions from the isosceles triangle defined by the lever 46. The permanent magnet means are supported in spaced relation above the chassis C by a pair of laterally spaced longitudinally extending support bars 40.

As is known in the art, position sensing means 70 are operable in response to the deflection of the scale pan carrier member 32 from its initial no-load position for causing compensation current generating means 72 to supply compensation current to the coil 26, whereby a force is generated by reaction with the flux of the permanent magnet means 10 to return the scale pan carrier 32 toward its initial no-load position. The magnitude of the compensation current affords an indication of the load applied to the scale pan as indicated by the load indicating means 74.

As shown in FIG. 2, the spring metal arms of the upper and lower guide means 34 are provided with recesses 42 and transverse grooves 44 for adjusting the strength and degree of resiliency of these arms.

OPERATION

In operation, upon the application of a load to be measured to the weighing pan and the pan carrier member 32, the pan carrier member 32 is displaced downwardly against the resilient force provided by the upper and lower guide means 34. Lever 46 is pivoted downwardly about the bending axis of the first bearing means 52 owing to the connection between the lever and the pan carrier member 32 afforded by the second flexible bearing strap 50, and consequently bearing 48, coil carrier rod 22, dish-shaped member 24, and the compensation coil 26 are displaced downwardly against the biasing force of the second guide means 62. The position means 70 senses this downward displacement of the pan carrier 32 and generates a signal that is supplied to the compensating current generating means 72 for supplying compensation current to the coil 26 to generate an electromagnetic force by reaction with the flux of the permanent magnet means 10 to tend to restore the coil 26 and pan carrier 32 upwardly toward their initial no-load positions. The magnitude of the compensation current, as indicated by the load indicating means 74, presents an indication of the magnitude of the load that was applied to the weighing pan.

It will be apparent that the more heavily stressed bearings 50 and 52 are stressed by tension forces only during the time of weighing operation of the weighing apparatus, and accordingly these flexible suspension straps need be dimensioned only so that they exhibit a small restoration force against bending. The third bearing means 48 is subjected to little bending stress and need only transmit relatively small forces (at a lever translation ratio of, for example, 1:10, only one tenth of the maximum load plus the dead-load portion).

In accordance with an important aspect of the present invention, the location of each of the bearing means 52, 50 and 48 may be adjusted longitudinally of the lever 46 to vary the effective operating length of the lever. More particularly, spacer plates 64 are illustrated as being connected between the first bearings 52 and the adjacent portion of the lever 48, which spacer plates may be replaced by spacer plates of different thickness to vary the sensitivity or resolution of the operation of the lever 46. Similar spacer plates may be provided between the connection of the other bearings 50 and 48 with the lever 46.

Figure 3:
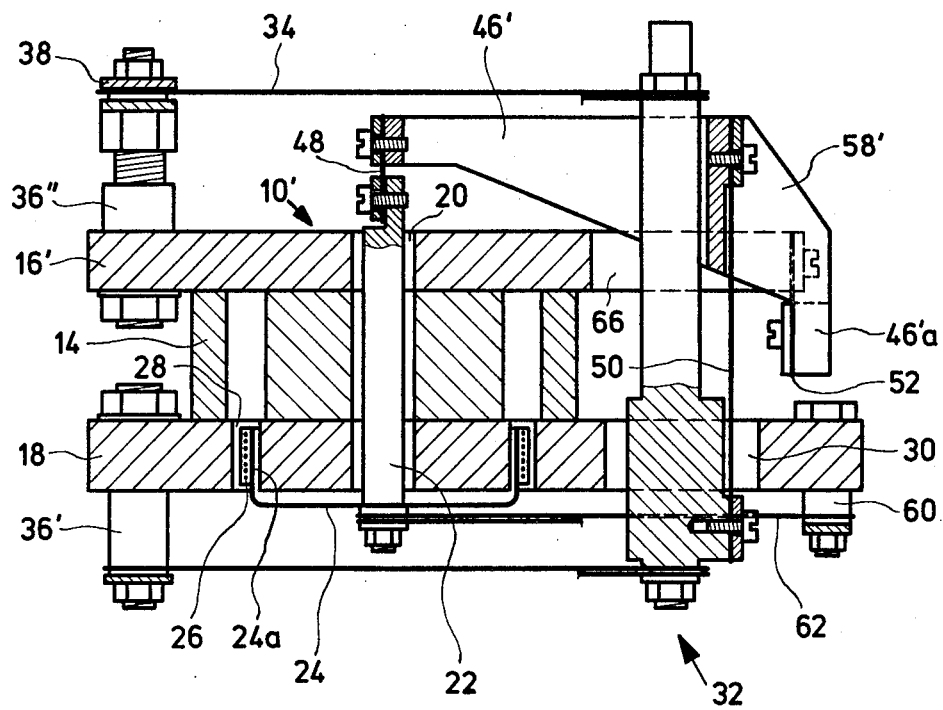
FIG. 3 is a longitudinally sectioned side elevational view of a modification of the one-arm lever embodiment of FIG. 1.

In one embodiment of FIGS. 1 and 2, the lever 46 is suspended by the first bearing means 52 from a lateral support 54 that is rigidly supported above the base plate 18 by the vertical post means 56. In the modification of FIG. 3, the lever 46' is suspended at its other end between a pair of laterally spaced longitudinal extensions 66 from the cover plate 16' by the first bearing means 52 for vertical movement in the vertical plane about the horizontal bending axis of the suspension bearings 52. As in the embodiment of FIGS. 1 and 2, the lever 46' has in horizontal cross-section the configuration of an isosceles triangle the apex portion of which is connected with the coil carrier rod 42 by means of the third bearing means 48, and the base portion of which has lateral extensions 46a' (corresponding with the lateral extensions 122 of FIG. 5) that are suspended from the cover plate extension 66 by means of the first bearing straps 52. As in the embodiment of FIGS. 1 and 2, the pan carrier member 32 is connected with an intermediate portion of the lever 46' by second bearing means including the suspension strap 50. The pan carrier member 32 is guided by resilient upper and lower guide means 34 each having in horizontal cross-section the configuration of an isosceles triangle which faces in the opposite direction from the isosceles triangle defined by the lever 46', thereby assuring maximum compactness and rigidity of the weighing apparatus. In the embodiment of FIG. 3, the base portion of the isosceles triangle defined by the upper guide means 34 is rigidly supported above an extension of the cover plate 16' by means of the vertical guide post means 36". The coil carrier means 22, 24 is guided for vertical movement by the resilient guide means 62 which also has the horizontal cross-sectional configuration of an isosceles triangle the apex portion of which is connected with the lower end of the coil carrier rod 22 and the base portion of which is connected with the base plate 18 by the vertical post means 60. The operation of the modification of FIG. 3 is identical to that of the embodiment of FIGS. 1 and 2.

Figure 4:
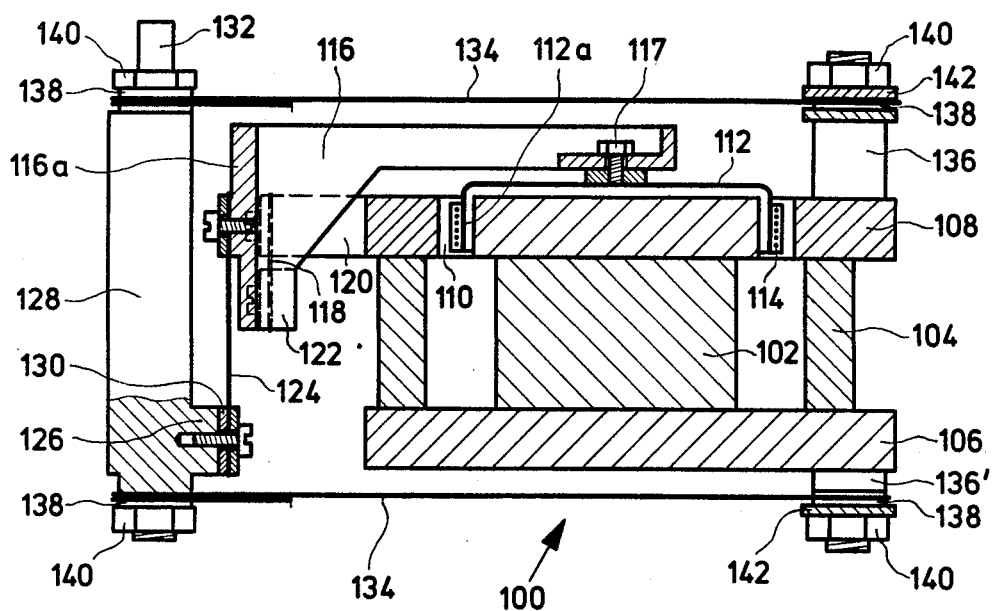
FIGS. 4 and 5 are longitudinally sectioned side elevation and top plan views, respectively, of a two-armed embodiment of the invention.
Figure 5:
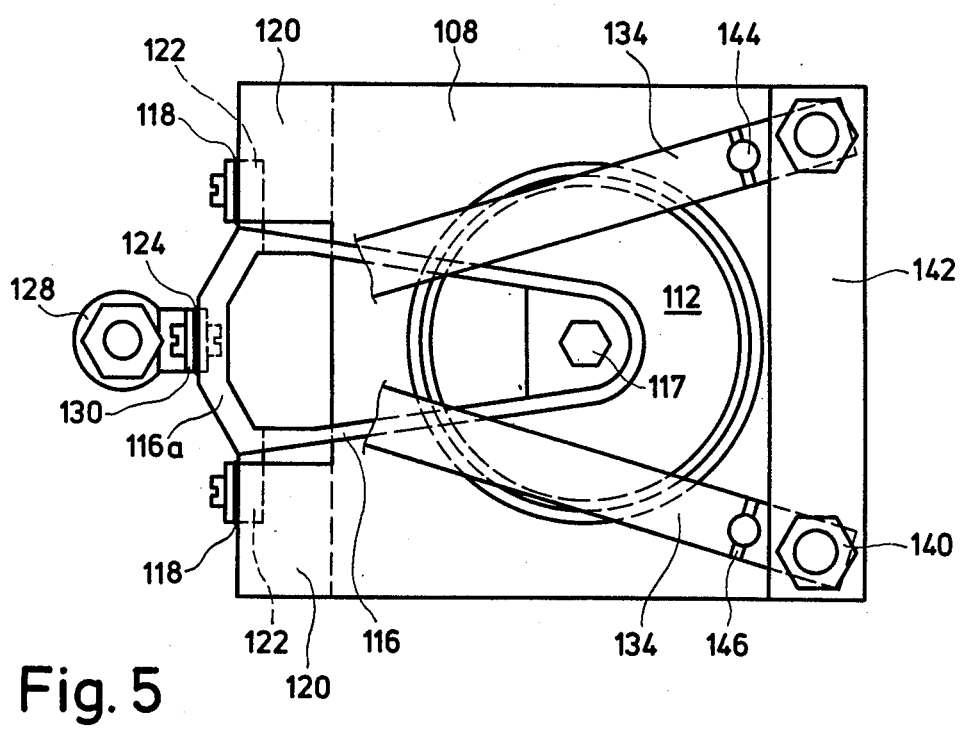

Referring now to the two-arm embodiment of the invention illustrated in FIGS. 4 and 5, the lever 116 includes intermediate its ends a pair of integral opposed lateral extensions 122 that are suspended by the first bearing means 118 from a pair of laterally spaced portions 120 that extend longitudinally from one end of the cover plate 108. At one end, the lever 116 is connected with the synthetic plastic dish-shaped coil carrier member 112 by means of the bolt 117, and at its other end 116a the lever is connected with the pan carrier 128 by the second suspension bearing means 124. The pan carrier member 128 is guided for vertical movement relative to the permanent magnet means by upper and lower resilient guide means 134. As shown in FIG. 5, the upper and lower resilient guide means have in horizontal cross-section the configuration of an isosceles triangle the apex of which is connected with the associated end of the pan carrier member 128. The base portion of the upper guide means 134 is supported in spaced relation above the cover plate 108 by first vertical post means 136, and the lower guide means 134 is supported in spaced relation below the base plate 106 by second vertical post means 136'. As shown in FIG. 5, the lever 116 also has in horizontal cross-section the configuration of an isosceles triangle the apex of which is connected with the coil carrier and the base portion of which includes lateral extensions 122 that extend beneath the extensions 120 from the cover plate and are connected thereto by the first bearing means 118. The pan carrier member 128 is suspended from the other end portion 116a of the lever by the second bearing means 124. Each of the bearings 118 and 124 comprises a vertical hanger strap that is flexible about parallel horizontal bending axes. In operation, when the pan carrier member 128 is displaced axially downwardly by the application of load to the scale pan (not shown) connected with the vertical pin 132, lever 116 pivots in the counterclockwise direction about the bending axis of the first bearing means 118, whereupon the compensation coil 114 connected with the coil carrier 122 is displaced axially upwardly. The displacement of the pan carrier member 128 from its initial no-load position is detected by the position sensing means to effect the supply of compensation current to the coil 114 which generates an electromagnetic force by reaction with the flux of the permanent magnet means 100 to displace the coil 114 downwardly and thereby pivot the lever 116 in the clockwise direction, whereby the pan carrier member 128 is displaced axially upwardly toward its initial no-load position.

It will be apparent that in the embodiment of FIGS. 4 and 5, the compensation coil 114 and the coil carrier 112 define a counterweight relative to the pan carrier member 128 and the weighing pan attached thereto. Consequently, the bearings 118 and 124 are additionally tensioned only during a weighing operation, and accordingly, they may possess only a very small cross-section so that they will exhibit only a small restoration moment against bending during the oscillation adjustment of the weighing apparatus. Thus, the two-arm self-taring embodiment offers the advantages that the coil carrier and coil serve as a counterweight, whereby no additional masses are necessary to balance the weighing pan and its carrier, and further since the load and counterweight are provided on opposite sides of the main lever bearing or fulcrum, the apparatus is less sensitive to vertical vibrations.

As in the embodiments of FIGS. 1–3, spacer plate means 130 may be provided for adjusting the position of the bearings relative to the lever, thereby to adjust the effective operating length of the lever. Consequently, in the embodiment of FIG. 4, the spacer plate 130 may be replaced by a spacer plate of different size to adjust the position of the bearing 124 relative to the pan carrier 128. Similarly, spacer plate means could be used to adjust the position of the first bearing means 118 relative to the two-arm lever 116.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. In a weighing apparatus of the electromagnetic load compensation type including stationary pot-type permanent magnet means containing at one end an annular air gap, a pan carrier member connected for vertical displacement relative to said permanent magnet means, an annular compensation coil concentrically arranged for coaxial displacement within said air gap, means connecting said compensation coil with said pan carrier member, and means operable when said pan carrier member is displaced from a normal no-load position relative to said coil to generate an electromagnetic force for returning the pan carrier member to its no-load position; the improvement wherein said means connecting said compensation coil with said pan carrier member comprises (a) coil carrier means connected with said compensation coil;
   (b) a horizontal lever connected at one end with said coil carrier means;
   (c) means including first bearing means connecting said lever with said permanent magnet means;
   (d) means including second bearing means connecting said pan carrier member with said lever; and
   (e) spacer means for adjusting the position of at least one of said bearing means longitudinally of said lever, thereby to adjust the effective operating length of said lever.

2. In a weighing apparatus of the electromagnetic load compensation type including stationary pot-type permanent magnet means containing to one end an annular air gap, a pan carrier member connected for vertical displacement relative to said permanent magnet means, an annular compensation coil concentrically arranged for coaxial displacement within said air gap, means connecting said compensation coil with said pan carrier member, and means operable when said pan carrier member is displaced from a normal no-load position relative to said coil to generate an electromagnetic force for returning the pan carrier member to its no-load position;

the improvement wherein said means connecting said compensation coil with said pan carrier member comprises (a) coil carrier means connected with said compensation coil;
   (b) a horizontal lever connected at one end with said coil carrier means;
   (c) means including first bearing means connecting said lever with said permanent magnet means;
   (d) means including second bearing means connecting said pan carrier member with said lever; and
   (e) horizontal resilient first guide means connecting said pan carrier member for vertical axial movement relative to said permanent magnet means, said first guide means having in horizontal cross section the configuration of an isosceles triangle the apex of which is connected with said pan carrier means, the base portion of said isosceles triangle being connected with said permanent magnet means on the opposite side thereof from said pan carrier member;
   (f) said lever also having in horizontal cross-section the configuration of an isosceles triangle the apex of which is connected with said coil carrier means, the base portion of the triangle defined by said lever being arranged on the opposite side of said permanent magnet means from the base portions of the triangle defined by said first guide means, whereby the isosceles triangles face each other to effect compactness of the weighing apparatus.

3. Apparatus as defined in claim 2, wherein each of said first and second bearing means comprises at least one vertical flexible suspension strap affording bending movement about a horizontal bending axis.

4. Apparatus as defined in claim 2, and further including second resilient horizontal guide means (62) for guiding said coil carrier means for vertical movement relative to said permanent magnet means, said second guide means having in horizontal cross-section the configuration of an isosceles triangle the apex of which is connected with said coil carrier means, the base portion of the triangle defined by said second guide means being on the same side of said permanent magnet means as the base portion of the triangle defined by said lever, whereby the isosceles triangles defined by said first and second guide means face each other to effect compactness of the weighing apparatus.

5. Apparatus as defined in claim 2, wherein said first guide means comprises upper and lower horizontal resilient guide means extending above and below said permanent magnet means, respectively.

6. Apparatus as defined in claim 2, wherein said permanent magnet means includes a horizontal base plate (18) containing an annular opening (28) defining said air gap, said base plate also containing an opening (30) within which said pan carrier is mounted for vertical displacement relative thereto; and further wherein said coil carrier means includes (1) a dish-shaped member (24) arranged beneath said base plate, said dish-shaped member having a cylindrical flange portion (24a) which extends upwardly within said gap and upon which said compensation coil is concentrically mounted;
   (2) a vertical coil carrier rod (22) connected at its lower end with the central portion of said dish-shaped member and extending upwardly through a central bore (20) contained in said permenent magnet means, the upper end of said vertical coil carrier rod being connected with said one lever end.

7. Apparatus as defined in claim 6, wherein said permanent magnet means includes a core portion (12), a ferromagnetic annular portion (14) arranged in concentrically spaced relation about said core portion, and a horizontal cover plate (16), said base plate extending at each end beyond said ferromagnetic annular portion and said cover plate; and further including means including first rigid vertical post means (56) for supporting said other end of said lever in spaced relation above said base plate.

8. Apparatus as defined in claim 7, wherein said lever has in horizontal cross-section the configuration of an isosceles triangle the apex of which is connected with the upper end of said coil carrier rod; and further wherein said vertical post means includes a pair of spaced vertical posts, and a horizontal transverse support member (54) connected between said posts, the base portion of the triangle defined by said lever being suspended from said support member by said first bearing means (52).

9. Apparatus as defined in claim 7, wherein said cover plate (16′) extends at one end beyond said ferromagnetic annular portion and contains an openings above the pan carrier opening (30) contained in said base plate; and further wherein the portion of said lever defining the base of the isosceles triangle extends downwardly below the elevation of said one cover plate end, said first bearing means including at least one flexible suspension strap suspending said other lever end from said one cover plate end.

10. In a weighing apparatus of the electromagnetic load compensation type including stationary pot-type permanent magnet means containing at one end an annular air gap, a pan carrier member connected for vertical displacement relative to said permanent magnet means, an annular compensation coil concentrically arranged for coaxial displacement within said air gap, means connecting said compensation coil with said pan carrier member, and means operable when said pan carrier member is displaced from a normal no-load position relative to said coil to generate an electromagnetic force for returning the pan carrier member to its no-load position;
the improvement wherein said means connecting said compensation coil with said pan carrier member comprises
(a) coil carrier means connected with said compensation coil;
(b) a horizontal one-arm lever;
(c) means including first bearing means connecting one end of said lever with said permanent magnet means;
(d) means including second bearing means connecting said pan carrier member with an intermediate portion of said lever; and
(e) third flexible bearing means connecting said coil carrier means with the other end of said lever for pivotal movement about a horizontal pivot axis.

11. Apparatus as defined in claim 10, wherein each of said first, second and third bearing means comprises a flexible suspension strap, and further including spacer means (64) for adjusting the position of at least one of said bearing means longitudinally of said lever, thereby to adjust the effective operating length of said lever.

12. In a weighing apparatus of the electromagnetic load compensation type including stationary pot-type permanent magnet means containing at one end an annular air gap, a pan carrier member connected for vertical displacement relative to said permanent magnet means, an annular compensation coil concentrically arranged for coaxial displacement within said air gap, means connecting said compensation coil with said pan carrier member, and means operable when said pan carrier member is displaced from a normal no-load position relative to said coil to generate an electromagnetic force for returning the pan carrier member to its no-load position.
the improvement wherein (a) said permanent magnet means includes a base plate, a core portion, an annular ferromagnetic portion arranged concentrically about said core portion, and a horizontal upper cover plate, said cover plate containing an annular opening defining said air gap and extending at one end beyond said annular ferromagnetic portion;
(b) and further wherein said means connecting said compensation coil with said pan carrier member comprises
(1) a horizontal two-arm lever;
(2) first bearing means connected at one end with an intermediate portion of said lever for suspending said lever from the extending end portion of said upper cover plate;
(3) coil carrier means connected with said compensation coil, said coil carrier means including an inverted dish-shaped member having an annular flangeportion that extends downwardly within said air gap and upon which said compensation coil is concentrically mounted, and a central portion connected with one end of said lever; and
(4) second bearing means connecting said pan carrier member with the other end of said lever, whereby the compensation coil and coil carrier means serve as a counterweight for the pan carrier member.

13. Apparatus as defined in claim 12, and further including spacer means (130) for adjusting the position of at least one of said bearing means longitudinally of said lever, thereby to adjust the effective operating lengths of said lever.

14. Apparatus as defined in claim 12, wherein said pan carrier member (128) is arranged adjacent the end of said lever remote from said permanent magnet means, and further including horizontal resilient first guide means (134) supporting said pan carrier member for vertical axial movement relative to said permanent magnet means.

15. Apparatus as defined in claim 14, wherein said first guide means has in horizontal cross-section the configuration of an isosceles triangle the apex of which is connected with said pan carrier member, and further including first vertical post means (136, 136′) for supporting the base portion of the triangle defined by said first guide means in spaced relation to one of said horizontal cover and base plates.

16. Apparatus as defined in claim 15, wherein said lever has in horizontal cross-section the configuration of an isosceles triangle the apex of which is connected with said dish-shaped coil carrier member, the portion of said lever defining the base of the isosceles triangle being connected with said extending end of said cover plate by said second bearing means, thereby to cause the isosceles triangles defined by said first guide means and said lever to face each other, whereby compactness of the apparatus is achieved.

17. Apparatus as defined in claim 16, wherein said lever includes a central longitudinal end extension portion (116a) that extends from the base portion of the triangle toward said pan carrier member, said second bearing means being operable to connect said lever extension portion with said pan carrier member.

* * * * *